UNITED STATES PATENT OFFICE.

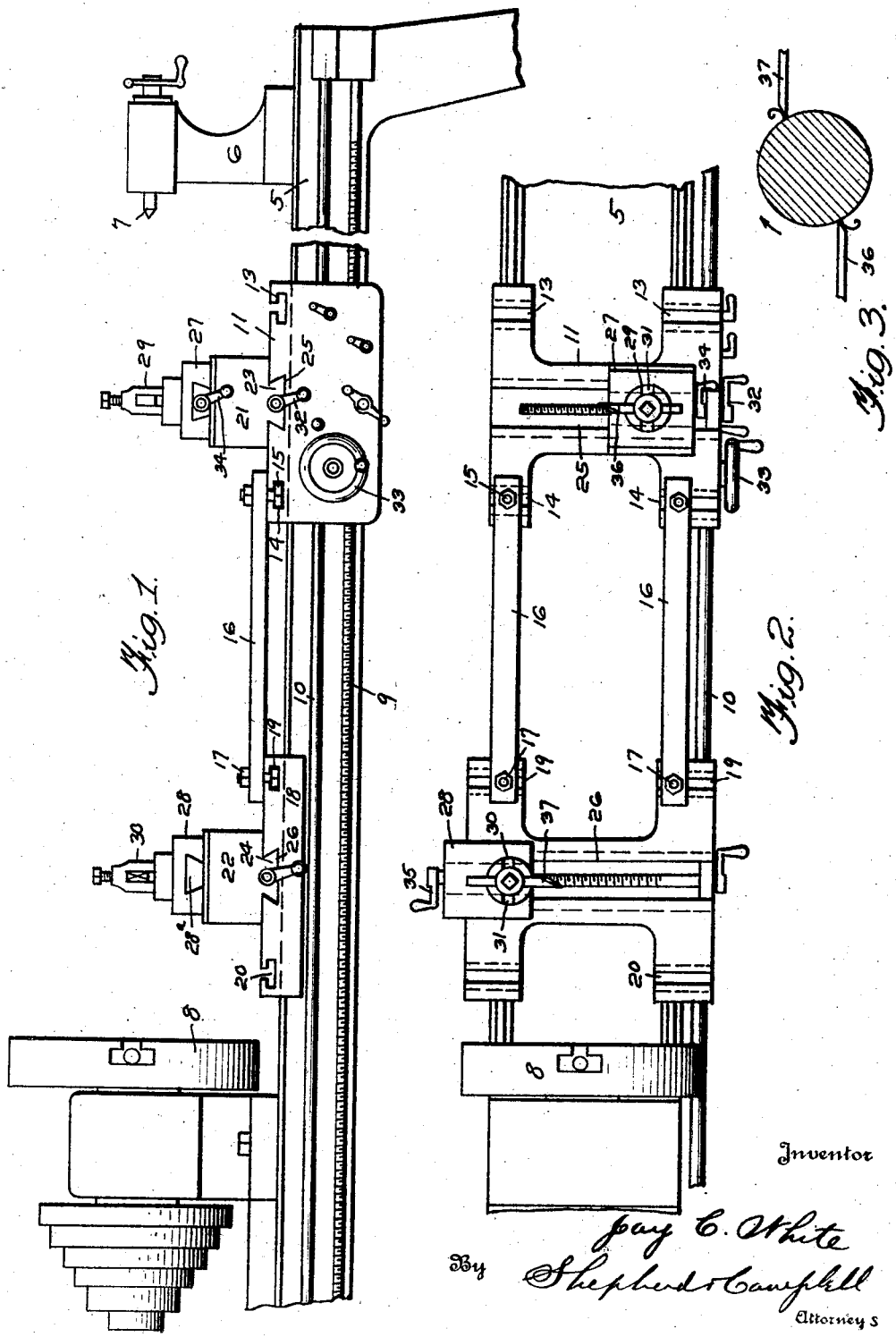

JAY C. WHITE, OF NEW CASTLE, PENNSYLVANIA.

MULTIPLE-CARRIAGE LATHE.

Application filed March 1, 1926. Serial No. 91,397.

This invention relates to lathes and it has for its object to provide an auxiliary carriage for a lathe, so that two tools may operate upon work simultaneously and at spaced points. The auxiliary carriage is connected to and moved under the influence of the main or power driven carriage of the lathe and may be readily removed from the lathe bed when not required.

Further objects and advantages of the invention will be set forth in the detailed description which follows:

In the accompanying drawing:

Fig. 1 is an elevation of a part of a lathe having the invention applied thereto, Fig. 2 is a plan view of the same, and Fig. 3 is a detail sectional view through the work showing the relation of the tools thereto.

In the drawing, 5 designates a lathe frame, 6 the tail stock, 7 the tail center, 8 the chuck, 9 the lead screw, and 10 the feed rod. The parts so far described are of usual and well known construction.

The main power driven carriage 11 is also of usual and well known construction except that it is provided with transverse T-slots 13 and 14. The slots 14 are shown as receiving the heads of bolts 15, by which spacing bars 16 are connected to the carriage. The other ends of these bars are connected by bolts 17, with the auxiliary carriage 18, the latter being provided with T-shaped ways or slots 19, for the reception of the heads of the bolts 17. Carriage 18 is also provided with slots 20. The purpose of providing the apparently useless slots 13 and 20 is to render it possible to connect additional auxiliary carriages to the main carriage 11 or to the first auxiliary carriage 18, when very long work is being operated upon. However, as a general rule, a single auxiliary carriage will be found to be sufficient.

It is apparent that with two tools operating upon the work, the carriage need travel only half as far in order to make an effective cut, as is the case when only one tool is operated upon the work. Thus, the operation of turning a given piece of metal is greatly facilitated and expedited by my construction. Furthermore, I contemplate disposing the two operating tools above and below the center line of the work, so that the action of one counter-balances the action of the other and chattering of the work is prevented without the necessity of employing a steady rest.

Both the main carriage 11 and the auxiliary carriage 18 carry transversely operating blocks 21 and 22, said blocks being provided with dove-tailed ribs 23 and 24, which travel in correspondingly shaped grooves 25 and 26, of the carriages, in a usual and known way. The blocks 21 and 22 have compounds 27 and 28 mounted upon their upper faces. These compounds are also of the usual and known type and carry tool posts 29 and 30, said tool posts being adjustable in cross-slots 31 of the compounds. All of the structure associated with the carriage 11 is the ordinary and known lathe construction, that is, the block 21 is capable of being fed transversely of the lathe bed, either under the influence of power or under the influence of a manually operable handle 32. The carriage 11 is also adapted to be fed longitudinally of the lathe under the operation of a hand wheel 33 and when this hand wheel is operated to move the carriage 11 longitudinally, the carriage 18 is caused to partake of the same movement because of its connection with the carriage 11 by the bars 16. The compound 27 is adapted to have back and forth movement on block 21 under the influence of an operating handle 34, in the usual and known way and, in like manner, the compound 28 is moved back and forth upon its base 28$^a$ under the influence of an operating handle 35.

By referring to Fig. 2, it will be seen that the compounds 27 and 28 are adjusted to such positions that the tools 36 and 37 of the tool posts lie upon opposite sides of the work "W" and below and above said work respectively. The purpose of thus arranging the tools is to cause the thrust of one tool to counteract the thrust of the other, and to thus prevent chattering of the work, without the necessity of employing a steady rest.

It is to be understood that the invention is not limited to the precise construction set forth but that it includes within its purview whatever changes fairly come within either the terms or the spirit of the appended claims.

Having described my invention, what I claim is:

1. In a lathe, an elongated bed, a tail stock and rotative chuck mounted at spaced points upon said bed, a main carriage mounted to travel longitudinally of the bed between the chuck and tail stock, power means constituting a part of the lathe mechanism for causing the main carriage to reciprocate longitudinally upon the bed, a cutting tool upon the main carriage, an auxiliary carriage mounted to travel upon the bed, detachable connecting means extending between the two carriages whereby movement of the main carriage is transmitted to the auxiliary carriage and a cutting tool upon the auxiliary carriage both of said cutting tools being adapted to act simultaneously upon the same piece of work extending between the chuck and tail center, said auxiliary carriage being actuated wholly by and in unison with the main carriage through said connecting means.

2. A structure as recited in claim 1, wherein the tools upon the two carriages are so disposed as to extend in opposite directions and to lie and act upon opposite sides of the work, so that the thrust of one tool is counteracted by the thrust of the other tool.

3. A structure as recited in claim 1, wherein the means for mounting the tools upon the said carriages comprise members slidable laterally of the lathe bed and across said carriages.

4. A structure as recited in claim 1 wherein the tools upon the two carriages are so disposed as to extend in opposite directions and lie and act upon opposite sides of the work, one of said tools lying above the horizontal center of the work and the other of said tools lying below the horizontal center of the work, whereby the thrust of one tool is counteracted by the thrust of the other tool.

In testimony whereof I affix my signature.

JAY C. WHITE.